United States Patent [19]

Sackmann et al.

[11] Patent Number: 4,596,863
[45] Date of Patent: Jun. 24, 1986

[54] N-ALKYLIMIDE COPOLYMERS AND THEIR USE AS SIZING AGENTS

[75] Inventors: Günter Sackmann, Leverkusen; Ulrich Beck, Bornheim; Heinz Bäumgen, Leverkusen, all of Fed. Rep. of Germany

[73] Assignee: Bayer Aktiengesellschaft, Leverkusen, Fed. Rep. of Germany

[21] Appl. No.: 607,103

[22] Filed: May 4, 1984

[30] Foreign Application Priority Data

May 26, 1983 [DE] Fed. Rep. of Germany ....... 3319014

[51] Int. Cl.$^4$ ..................... C08F 22/40; D21D 3/00
[52] U.S. Cl. .................................. 526/262; 162/168.5
[58] Field of Search ..................... 526/262; 162/168.5

[56] References Cited

U.S. PATENT DOCUMENTS 2,342,295  2/1944  Orthner et al. ..................... 526/262

FOREIGN PATENT DOCUMENTS 2232543  7/1972  Fed. Rep. of Germany ... 162/168.5
2142968  3/1973  Fed. Rep. of Germany .
2361544  6/1975  Fed. Rep. of Germany ... 162/168.5
2065676  7/1981  United Kingdom ................ 526/262

Primary Examiner—Joseph L. Schofer
Assistant Examiner—Peter F. Kulkosky
Attorney, Agent, or Firm—Sprung Horn Kramer & Woods

[57] ABSTRACT

The present invention relates to new copolymers based on maleic anhydride/α,β-unsaturated compounds and characterized in that they consist of
(A) 10 to 40 mol percent of the structural element

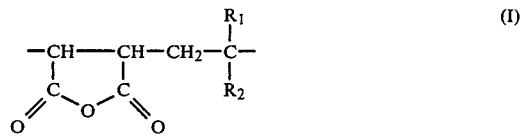

(B) 40 to 80 mol percent of the structural element

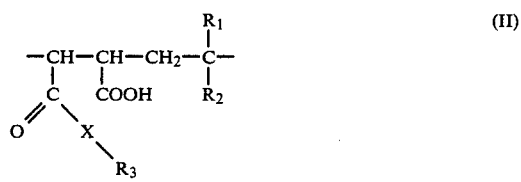

and
(C) 10 to 50 mol percent of the structural element

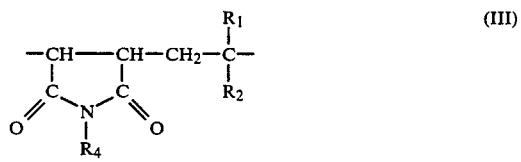

where the total of mol percentages of (A), (B) and (C) is 100 and
where
$R_1$ = hydrogen or alkyl,
$R_2$ = hydrogen, alkyl or optionally substituted aryl,
$R_3$ = a hydrocarbon radical having 10 to 22 C atoms,
$R_4$ = a hydrocarbon radical having 10 to 22 C atoms, and
X = an oxygen atom or an $NR_5$ group where $R_5$ represents a hydrocarbon radical having 1 to 18 C atoms.

The copolymers in question are excellent active ingredients for sizing agents for paper and are suitable not only for pulp-sizing but also for surface-sizing.

5 Claims, No Drawings

N-ALKYLIMIDE COPOLYMERS AND THEIR USE AS SIZING AGENTS

The present invention relates to new copolymers based on maleic anhydride/$\alpha,\beta$-unsaturated compounds and characterised in that they consist of (A) 10 to 40 mol percent of the structural element

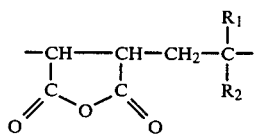

(B) 40 to 80 mol percent of the structural element

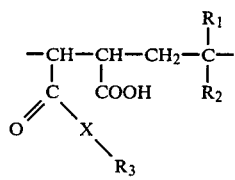

and (C) 10 to 50 mol percent of the structural element

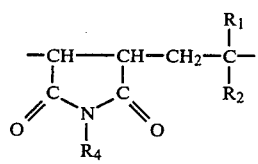

where the total of mol percentages of (A), (B) and (C) is 100 and
where
$R_1$ = hydrogen or alkyl,
$R_2$ = hydrogen, alkyl or optionally substituted aryl,
$R_3$ = a hydrocarbon radical having 10 to 22C atoms,
$R_4$ = a hydrocarbon radical having 10 to 22C atoms, and
X = an oxygen atom or an $NR_5$ group where $R_5$ represents a hydrocarbon radical having 1 to 18C atoms.

Simplified, the polymers according to the invention can be characterised as follows:

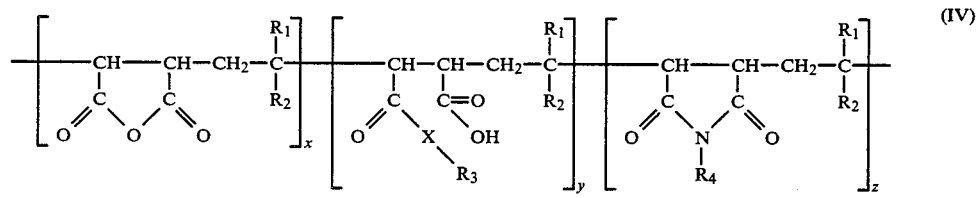

where
x = 10 to 40 mol percent,
y = 40 to 80 mol percent, and
z = 10 to 50 mol percent
and
where $R_1$, $R_2$, $R_3$ and $R_4$ have the abovementioned meanings.

The schematic formula (IV) leaves out of consideration the terminal groups.

The polymers according to the invention can be used as sizing agents for paper either alone or in combination with cationic fixing agents (such as, for example, cationic starch, cationic polyacrylamides, quaternised polyamines or polyamide-amines) and they display excellent sizing properties. They are reactive sizing agents.

The invention, therefore, further relates to sizing agents for paper which contain the polymers of the formula (IV) as an active ingredient.

The following remarks apply to the sizing of paper in general:

The sizing of paper is generally done with synthetic or natural sizing agents which either are added to the paper pulp or are applied to the finished paper web by means of a size press. The first case is called pulp-sizing, while the second case is surface-sizing. The sizing action can arise from two different mechanisms, depending on the type of sizing agent used: (1) If sizing agents are used together with cationic fixing agents, such as, for example, aluminium sulphate or cationically charged polymers, which carry no groups capable of reacting with the OH or $CH_2OH$ groups of cellulose (for example resin size, paraffins or certain synthetic high polymers), sizing is effected by an ionic fixing of the substances to the cellulose fibre. (2) So-called reactive sizing agents achieved their sizing action by a formation of covalent bonds between the sizing agent and the cellulose of the paper. Reactive sizing agents is the name given, in general to low molecular weight hydrophobic substances having functional groups which are capable of chemical reaction with the cellulose. Examples of reactive sizing agents are stearoyldiketene, tetrapropenylsuccinic anhydride, stearyl isocyanate, dehydroabietyl isocyanate, epoxides, aziridine-amides and derivatives of cyanuric chloride and trifluorotriazine.

Reactive sizing agents have an advantage over the non-reactive products in that they are more effective by virtue of their firm bond to the fibres. This is confirmed by recent research findings (see also Kamutzky and Krause in "Das Papier" 36 (1982) 7, page 311 et seq.). For this reason, the sizing agent levels required for achieving a good sizing action are significantly lower than if non-reactive sizing agents are used.

The reactive sizing agents which have become established in practice to date have in the main been products which contain stearoyldiketene as active substance. These products, which can be in the form of aqueous suspensions, or solutions in organic solvents, either alone or in combination with cationic starch or cationically charged polymers, have good to very good sizing properties, in particular on papers produced in a neutral or weakly alkaline medium. Papers produced under neutral or weakly alkaline conditions are usually understood as meaning papers which have been produced with $CaCO_3$ as filler and without the addition of aluminium sulphate. It is a disadvantage of any stearoyldiketene-based sizing agent that these products have only a very weak sizing action, if any at all, on papers which contain not chalk but kaolin as filler. It is a further disadvantage of stearoyldiketene-based sizing agents that it always takes 1 to 2 days for the full sizing effect to develop (i.e. they require an afterripening period). In order to use these products to obtain papers which have been fully sized immediately on exit from the paper machine, the paper web would have to be heated to higher temperatures than it is on the drying cylinders in the dry end of the paper machine.

There is therefore great interest in preparing sizing agents which give good sizing on papers containing disparate fillers, such as chalk or kaolin, and on alkaline, neutral or acid papers. It is also desirable for the sizing to become effective without delay, namely immediately after the drying process for the paper web has ended.

It is therefore the object of the invention to prepare a reactive sizing agent for paper which has a sizing action which is good on papers which differ greatly in their composition and which are produced at different pH values, and which ideally develops its full effectiveness immediately on exit of the paper web from the paper machine.

This object is surprisingly achieved when polymers of the formula (IV) are used for sizing paper.

The substituents $R_1$ to $R_4$ of the formulae (I) to (IV) have the following preferred meanings:
$R_1$=hydrogen or methyl,
$R_2$=hydrogen, alkyl ($C_1$-$C_6$) or optionally chlorine-, methoxy- or OH-substituted phenyl,
$R_3$=alkyl ($C_{10}$-$C_{18}$),
$R_4$=alkyl ($C_{10}$-$C_{22}$) or dehydroabietyl, and
$X$=an oxygen atom or $NR_5$ where $R_5$=alkyl ($C_1$-$C_{18}$).
Alkyl ($C_1$-$C_6$) can be linear or branched.

The products according to the invention are reaction products of alternating copolymers of maleic anhydride and $\alpha,\beta$-unsaturated compounds of the formula (V)

where $R_1$ and $R_2$ have the abovementioned meanings, with monoalcohols or secondary monoamines of the formula (VI)

where $X$ and $R_3$ have the abovementioned meanings, during which some of the anhydride groups are converted into half-esters or half-amide groups, and with long-chain primary monoamines of the formula (VII)

where $R_4$ has the abovementioned meaning, during which some other anhydride groups are converted into imide groups.

As already mentioned above, the ratio of the groupings (A):(B):(C) in the copolymer according to the invention is (10–40 mol percent):(40–80 mol percent):(10–50 mol percent).

The starting copolymers are prepared from maleic anhydride and $\alpha,\beta$-unsaturated compounds (V) in a known manner, namely by bulk, solution or suspension copolymerisation initiated with free radicals. A particularly simple process for this is described in German Offenlegungsschrift No. 2,501,123, where the copolymerisation of maleic anhydride with $\alpha$-olefines takes place in suspension in the presence of special suspending auxiliaries, and excess $\alpha$-olefine is used as the suspending medium.

The molecular weights of the copolymers thus prepared are within the range from about 5,000 to about 400,000.

The reaction of the starting copolymers of maleic anhydride and $\alpha,\beta$-unsaturated compounds (V) with the aliphatic monoalcohols or secondary aliphatic monoamines (VI) can take place at temperatures between 50° and 150° C., preferably at 100° to 120° C., in bulk or in solution. Possible monoalcohols for this are chiefly decanol, dodecanol, tetradecanol, hexadecanol, octadecanol and behenyl alcohol, and a possible secondary amine is methyloctadecylamine. These monoalcohols and secondary monoamines are used in such amounts that between 40 and 80 mol % of the cyclic anhydride groups, preferably 40 to 70 mol %, are converted into half-ester and half-amide groups respectively. If this conversion takes place in the presence of a solvent such as toluene or xylene, the initially insoluble copolymer will gradually dissolve in whatever solvent is used as the degree of conversion increases. Afterwards 10–50 mol % of the anhydride groups originally present are reacted with highly hydrophobic primary monoamines to form imide groupings.

This reaction is carried out in water-immiscible solvents, such as, for example, toluene or xylene, at temperatures from 100° to 170° C., preferably at 120° to 150° C., with elimination of water of reaction. The hydrophobic monoamines used in the reaction are dodecylamine, tetradecylamine, hexadecylamine, octadecylamine or dehydroabietylamine.

The 10–40 mol % of anhydride groups still remaining in the polymer molecule after the reaction with the monoalcohols/secondary amines and primary amines are the reactive groups via which the cellulose is bonded to the sizing agent in the course of sizing.

In particular, it is essential for the sizing action of the products according to the invention that they contain anhydride, half-ester/half-amide and imide groups in the molar ratios specified above. Preferred products contain 20 to 40 mol % of anhydride, 40 to 70 mol % of half-ester/half-amide and 10 to 30 mol % of imide groups. The free carboxyl groups which are also still present in the copolymers can be additionally converted into their salts with amines. However, this salt formation is not necessary for attaining a good sizing action.

In a preferred embodiment of the invention, copolymers VIII and IX, below, are used as sizing agents in the production of paper:

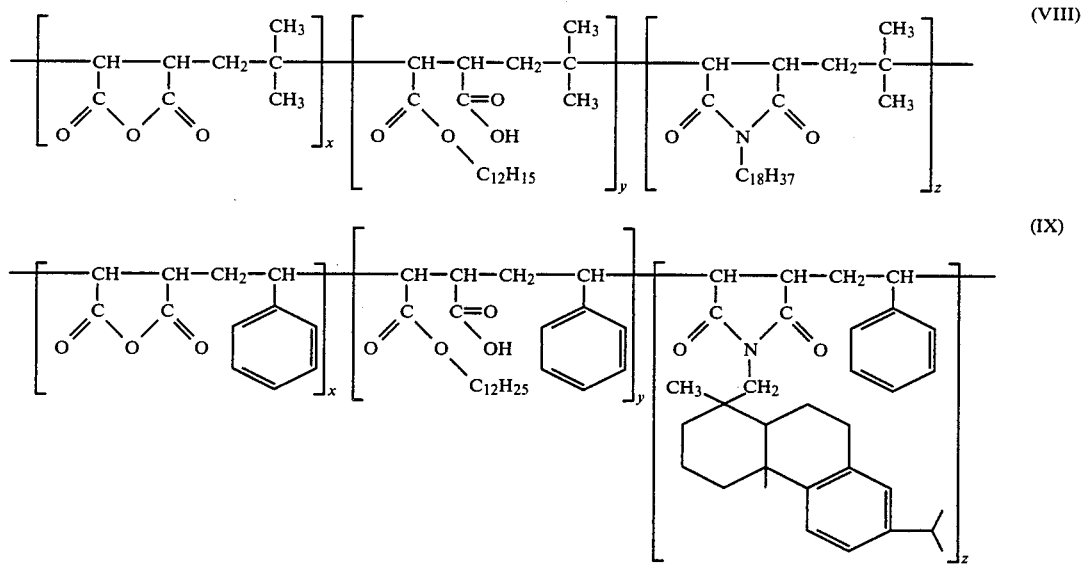

where
$C_{12}H_{25}$ = n-dodecyl and
$C_{18}H_{37}$ = stearyl and
where x, y and z have the abovementioned meanings.

The paper-sizing processes for which the sizing agents according to the invention are employed can be not only of the surface-sizing but also of the pulp-sizing type. For this purpose, the copolymers described, which carry anhydride, half-ester/half-amide and imide groups, can be used in the form of solutions, for example in organic solvents such as toluene or xylene, or in the form of aqueous formulations, such as, for example, as suspensions or emulsions. Examples of highly suitable suspending auxiliaries are polyvinyl alcohol and water-soluble cellulose derivatives, in particular cationic starch. If desired, non-reactive emulsifiers can also be added, to improve the stability of the emulsion.

EXAMPLES

Example 1

154 g of an alternating copolymer prepared from maleic anhydride and isobutylene and having an intrinsic viscosity $[\eta]$, measured in DMF, of 1.2 $[^{dl}/_g]$ are stirred together with 186 g of dodecyl alcohol at a temperature of 120° C. for 24 hours. The resulting melt is dissolved in such an amount of xylene as to form a polymer solution having a solids content of about 20%.

13.5 of stearylamine are added with stirring to 180.3 g of this solution in xylene, and the mixture is heated at 140° to 150° C. for 24 hours. The water of reaction eliminated in the course of this reaction is azeotropically distilled out of the reaction mixture, and the resulting solution of the sizing agent is diluted with xylene to bring it to a solids content of about 10%.

Composition of the copolymer:
$x \approx 28$ mol %
$y \approx 50$ mol %
  determined by IR spectroscopy
$z \approx 22$ mol % calculated from the amount of $H_2O$ eliminated

Example 2

202 g of an alternating copolymer prepared from maleic anhydride and styrene and having an intrinsic viscosity $[\eta] = 1.48$ $[^{dl}/_g]$, measured in DMF, are stirred together with 186 g of dodecyl alcohol at a temperature of 120° C. for 24 hours. The resulting reaction mixture is dissolved in xylene, and the solution is adjusted to a solids content of 20% by weight.

194 g of this solution are reacted with 7.1 g of dehydroabietylamine at 140° to 150° C. for 24 hours, during which the water of reaction formed is azeotropically distilled out of the solution. The resulting solution of sizing agent is diluted with xylene to a solids content of about 10%.

Composition of the copolymer:
$x \approx 30$ mol %
$y \approx 60$ mol %
  determined by IR spectroscopy
$z \approx 10$ mol % calculated from the amount of $H_2O$ eliminated

Example 3

Use of the products (sizing agent 1 and sizing agent 2) prepared as described in Examples 1 and 2 as sizing agents for paper.

In order to determine the sizing properties of the substances according to the invention as far as possible without outside interference, i.e. in order to exclude any effect due to the formulation, the test described below is carried out on papers of various compositions.

| Paper type A: (neutral) | 50 parts of pinewood sulphate |
| | 50 parts of birch sulphate |
| | 10 parts of chalk |
| Paper type B: (neutral) | 50 parts of pinewood sulphate |
| | 50 parts of birch sulphate |
| | 10 parts of kaolin |
| Paper type C: (acid) | 50 parts of pinewood sulphate |
| | 50 parts of birch sulphate |
| | 12 parts of kaolin |
| | 1.5 parts of alum |

The sizing agents under test were applied in the form of 0.1% solutions in toluene to these papers on a pad-mangle, and excess solution was squeezed off. The papers were then subjected to aftertreatments I–IV:

| | Type of aftertreatment | Effect under investigation |
|---|---|---|
| I | 5 minutes at 150° C. | Action of the fully reacted sizing agent |
| II | 1 minute at 90° C. | Start of the reaction of the pure active ingredient at industrially customary temperatures <120° C. |
| III | 5 minutes at 90° C. between two wet filter papers | Effect of moisture |
| IV | Air-dried at 20° C. | Any sizing without chemical reaction |

The sized papers aftertreated in accordance with I–IV are cut into strips which are 3 cm wide and 9 cm long and are placed on blue test ink. After 1 minute in that position the sample papers are lifted off the ink, are squeezed off on blotting paper with the reverse face down, and are assessed after 5 minutes. The extent to which the ink has penetrated the paper, and hence the degree of sizing, is qualitatively assessed by awarding marks from 1 to 5, which carry the following meaning:
1: no ink penetration
2: 5–10% ink penetration
3: 10–20% ink penetration
4: about 50% ink penetration
4.5*: about 90% ink penetration
5: 100% ink penetration
* Other intermediate values can also be used.

The table below gives the assessment of the sizing action of the sizing agents according to the invention on papers A, B and C in accordance with the abovementioned scale. Stearoyldiketene, used as the active substance in many commercially available sizing agents, was used to provide a comparison with the state of the art.

| | Experimental results | | | | | |
|---|---|---|---|---|---|---|
| | Solids content | Assessment of sizing with aftertreatment | | | | Average |
| Sizing agent | in toluene | I | II | III | IV | assessment |
| 1. Paper type A: (chalk-containing, neutral) | | | | | | |
| Sizing agent 1 according to the invention | 0.1% | 1 | 1 | 1 | 1 | 1.0 |
| Sizing agent 2 according to the invention | 0.1% | 1 | 1 | 1 | 2 | 1.25 |
| Stearoyldiketene | 0.1% | 1 | 4.5 | 2 | 5 | 3.1 |
| 2. Paper type B: (kaolin-containing, neutral) | | | | | | |
| Sizing agent 1 according to the invention | 0.2% | 1 | 1 | 2 | 3 | 1.75 |
| Sizing agent 2 according to the invention | 0.1% | 1.5 | 1.5 | 1.5 | 2 | 1.63 |
| Stearoyldiketene | 0.2% | 2 | 5 | 5 | 5 | 4.25 |
| 3. Paper type C: (kaolin-containing, acid) | | | | | | |
| Sizing agent 1 according to the invention | 0.2% | 1 | 1 | 1.5 | 2 | 1.38 |
| Sizing agent 2 according to the invention | 0.1% | 1 | 1 | 2 | 4 | 2.0 |
| Stearoyldiketene | 0.2% | 4.5 | 5 | 5 | 5 | 4.88 |

The tabled experimental results clearly show that the sizing agents according to the invention are markedly superior to the state of the art stearoyldiketene on all of the three types of paper investigated. This superiority is particularly manifest on the B and C types of paper (kaolin-containing and neutral, and kaolin-containing and acid), where stearoyldiketene is virtually ineffective, although stearoyldiketene was used in a concentration twice as high as that of, for example, sizing agent 2 according to the invention.

Example 4

In order to demonstrate how well the sizing agents according to the invention adhere to the papers sized with them, type A paper (chalk-containing) treated with 0.1% strength toluene solutions of sizing agent 1 according to the invention and of stearoyldiketene was dried at 120° C., then washed for 5 minutes with $CHCl_3$, and then subjected to a further ink flotation test. The assessment of the ink flotation samples according to the table given under Example 3 produced the following values:

| | Solids content in | Assessment of sizing | |
|---|---|---|---|
| Sizing agent | toluene | washing out with $CHCl_3$ | without washing out |
| Sizing agent 1 according to the invention | 0.1% | 1 | 1 |
| Stearoyldiketene | 0.1% | 3 | 1 |

The differences between sizing agent 1 according to the invention and stearoyldiketene can be seen even more clearly if the papers sized with the sizing agents are dried at various temperatures and are then likewise treated with $CHCl_3$. The assessments of the results of the ink flotation samples have been compiled into the following table.

| | Assessment of sizing after $CHCl_3$ treatment | |
|---|---|---|
| Drying temperature | Sizing agent 1 according to the invention | Stearoyldiketene |
| 120° C. | 1 | 2.5 |
| 110° C. | 1 | 3.5 |
| 100° C. | 1 | 4 |
| 90° C. | 1 | 4.5 |
| 80° C. | 1 | 5 |
| 20° C. | 1 | 5 |

This table reveals that sizing agent 1 according to the invention firmly adheres to the paper at as low a temperature as room temperature, while a substantial portion of the stearoyldiketene is washed out again even at drying temperatures up to 100° C., as is revealed by the assessment of the ink flotation samples.

In addition the advantage of being effective on kaolin-containing neutral and acid papers, the sizing agents according to the invention offer a further advantage over stearoyldiketene, namely that significantly less energy is required to develop their sizing properties in full.

We claim:

1. A sizing agent for paper, characterized in that it contains as active ingredient a copolymer based on maleic anhydride $\alpha,\beta$-unsaturated compounds, characterized in that they consist of (A) 10 to 40 mol percent of the structural element (B) 40 to 80 mol percent of the structural element $$\begin{array}{c}\phantom{O}\phantom{\,}R_1\\-CH-CH-CH_2-C-\\ \phantom{-CH-}C\phantom{-CH_2-}C\phantom{-}R_2\\ \phantom{-}O\diagdown O\diagup O\end{array}\quad \text{(II)}$$

and (C) 10 to 50 mol percent of the structural element $$\begin{array}{c}\phantom{O}\phantom{\,}R_1\\-CH-CH-CH_2-C-\\ \phantom{-CH-}C\phantom{-CH_2-}C\phantom{-}R_2\\ \phantom{-}O\diagdown N\diagup O\\ \phantom{-O\diagdown}R_4\end{array}\quad \text{(III)}$$

where the total of mol percentages of (A), (B), (C) is 100 and where $R_1$ = hydrogen and alkyl,
$R_2$ = hydrogen, alkyl or optionally substituted aryl,
$R_3$ = a hydrocarbon radical having 10 to 22C atoms,
$R_4$ = a hydrocarbon radical having 10 to 22C atoms, and X = an oxygen atom or an $NR_5$ group where $R_5$ represents a hydrocarbon radical having 1 to 18C atoms.

2. A sizing agent for paper, characterised in that it contains as active ingredient a copolymer according to claim 1, characterised in that
$R_1$ = hydrogen or methyl,
$R_2$ = hydrogen, alkyl ($C_1$-$C_6$) or optionally chlorine-, methoxy- or OH-substituted phenyl,
$R_3$ = alkyl ($C_{10}$-$C_{18}$),
$R_4$ = alkyl ($C_{10}$-$C_{22}$) or dehydroabietyl, and
X = an oxygen atom or $NR_5$ where $R_5$ = alkyl ($C_1$-$C_{18}$).

3. A sizing agent for paper, characterised in that it contains as active ingredient a copolymer according to claims 1 and 2, characterised in that
$R_1$ = H or $CH_3$,
$R_2$ = H, $CH_3$, —$CH_2$—$C(CH_3)_3$ or phenyl,
$R_3$ = n-dodecyl or stearyl,
$R_4$ = n-dodecyl, stearyl or dehydroabietyl, and
X = an oxygen atom.

4. A sizing agent for paper, characterised in that in contains the following copolymer as active ingredient:

where
x = 10 to 40 mol percent,
y = 40 to 80 mol percent, and
z = 10 to 50 mol percent,
and where
the mole percentages x, y and z add up to 100.

5. A sizing agent for paper, characterised in that it contains the following copolymer as active ingredient:

wherein
x = 10 to 40 mol percent,
y = 40 to 80 mol percent,
z = 10 to 50 mol percent,
and where
the mol percentages x, y and z add up to 100.

* * * * *

UNITED STATES PATENT AND TRADEMARK OFFICE
CERTIFICATE OF CORRECTION

PATENT NO. : 4,596,863
DATED : June 24, 1986
INVENTOR(S) : Günter Sackmann, et al.

It is certified that error appears in the above-identified patent and that said Letters Patent is hereby corrected as shown below:

| | |
|---|---|
| Col. 2, line 23 | Delete "achieved" and substitute --achieve-- |
| Col. 5, Formula (VIII) | Bottom of middle structure delete "$C_{12}H_{15}$" and substitute --$C_{12}H_{25}$-- |
| Col. 9, line 39 | After "(B)" insert --and-- |
| Col. 9, line 59 | After "hydrogen" delete "and" and substitute --or-- |
| Col. 10, line 22 | After "that" delete "in" and substitute --it-- |
| Col. 10, line 39 | Delete "mole" and substitute --mol-- |

Signed and Sealed this

Fourteenth Day of October, 1986

[SEAL]

Attest:

DONALD J. QUIGG

*Attesting Officer*   *Commissioner of Patents and Trademarks*